United States Patent [19]

Boyers et al.

[11] Patent Number: 4,856,794
[45] Date of Patent: Aug. 15, 1989

[54] OIL SEAL WITH ANTIROTATION RIBS

[75] Inventors: Douglas B. Boyers, Union Lake; Steven R. Wilkening, Redford, both of Mich.

[73] Assignee: Federal-Mogul Corporation, Southfield, Mich.

[21] Appl. No.: 77,132

[22] Filed: Jul. 23, 1987

[51] Int. Cl.$^4$ .............................................. F16J 15/32
[52] U.S. Cl. .................................... 277/37; 277/136; 277/152; 277/153; 277/208
[58] Field of Search ..................... 277/37, 35, 38, 39, 277/40, 207 R, 211, 153, 208, 152, 153, 136, 137

[56] References Cited

U.S. PATENT DOCUMENTS

| | | | |
|---|---|---|---|
| 3,022,081 | 2/1962 | Kosatka | 277/39 |
| 3,028,203 | 4/1962 | Lund et al. | |
| 3,156,474 | 11/1964 | Nelson | 277/39 |
| 3,320,004 | 5/1967 | Garrett | 277/208 |
| 3,356,376 | 12/1967 | Bradfute | 277/37 |
| 3,561,770 | 2/1971 | Corsi et al. | 277/39 X |
| 3,913,924 | 10/1975 | Barefoot et al. | 277/37 |
| 4,037,849 | 7/1977 | Thumm | 277/37 |
| 4,557,488 | 12/1985 | Litherland | 277/208 X |

FOREIGN PATENT DOCUMENTS 859860  1/1961  United Kingdom ................. 277/37

*Primary Examiner*—Allan N. Shoap
*Attorney, Agent, or Firm*—Lawrence J. Shurupoff

[57] ABSTRACT

A unitized oil seal is provided with axially extending and radially protruding elastomeric ribs for preventing rotation of one of the oil seal members about a shaft or within a bore. The ribs are designed to reduce installation forces and thereby reduce seal damage due to excessive deformation during installation.

9 Claims, 3 Drawing Sheets

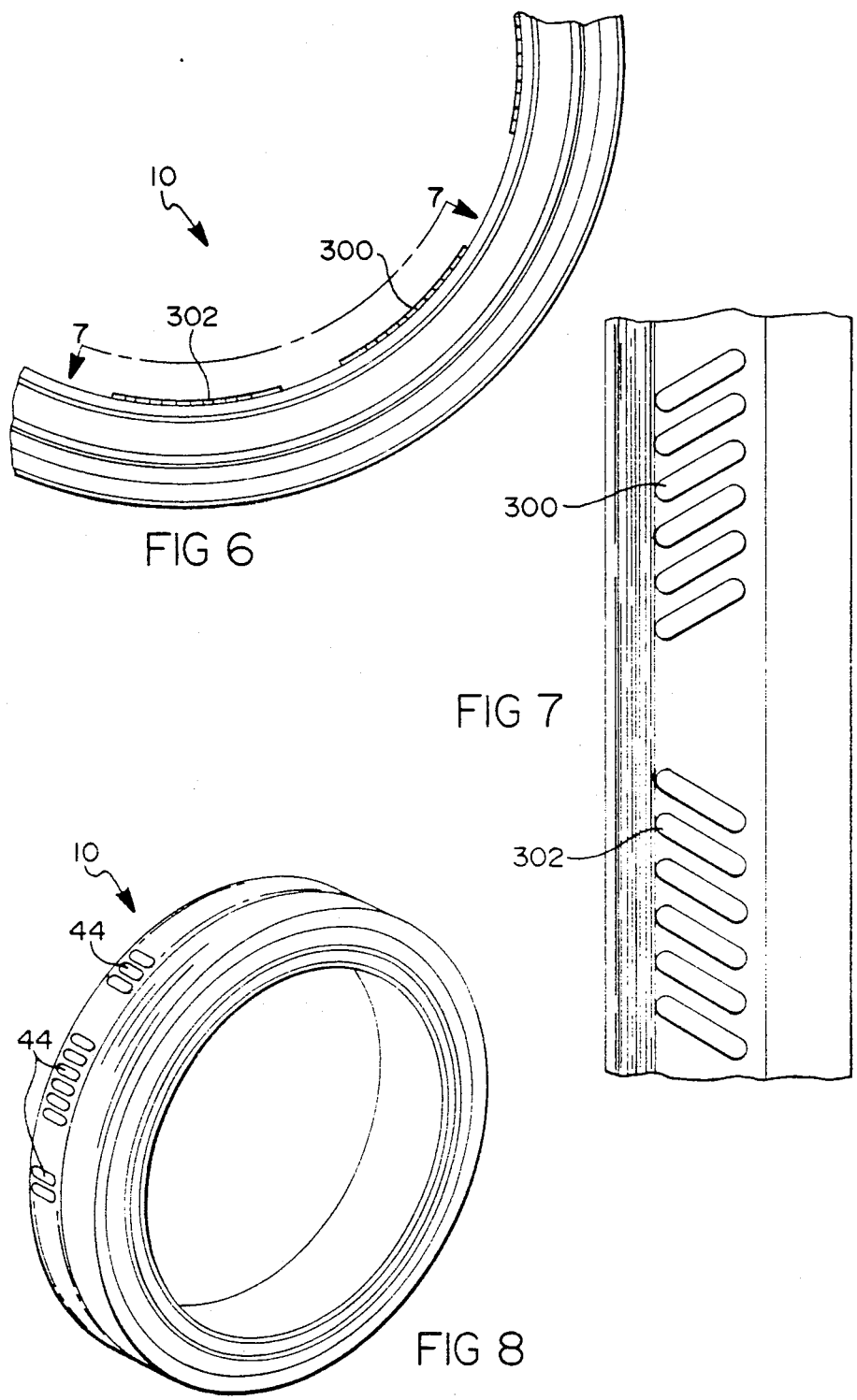

OIL SEAL WITH ANTIROTATION RIBS

BACKGROUND OF THE INVENTION

Field of the Invention

The present invention generally relates to oil seals of the type for sealing between rotatable members and particularly relates to oil seals provided with elastomeric ribs for preventing rotation of the seal about a shaft or within a bore.

In automobile and truck applications the wheel hubs are rotatably mounted on bearings supported on stationary axles. To keep these bearings lubricated at all times, an oil-filled space is generally provided adjacent the bearings. Oil seals are provided between the hub and the axle for preventing oil from leaking out of the bearings, keeping lubrication within the bearings and sealing the bearings from harmful contamination by outside dirt.

Prior oil seals have included a single-piece bore seal having a portion secured in sealing engagement in a bore in a hub, and a lip portion surrounding the axle for sealing during rotation between the hub and the axle. A problem associated with these seals is rapid lip wear caused by contact with axle surfaces not designed as sealing surfaces. To overcome this problem, some seals now include a rotational wear surface which is engaged by a sealing lip to increase the useable life of the seal.

An example of such a seal is disclosed in Corsi, et al, U.S. Pat. No. 3,561,770. This seal includes an integral unit which has two members rotatable with respect to one another. One of the members is secured to the axle and the other secured to the bore in the hub. The members are rotationally sealed together. One of the members has a wear sleeve and the other member includes a rotational seal with an annular lip for engaging the wear sleeve member.

This arrangement accommodates the rotational sealing engagement between the members since the outer member which is attached to the hub is rotatable with respect to the inner member which is attached to the axle. In such a seal the inner member includes a wear sleeve portion and the outer member has a rotational seal with a lip which is rotatable about and sealingly engages the wear sleeve surface. This allows for the use of a smooth wear sleeve surface which is designed for engagement by the lip of the seal in order to reduce seal wear.

While these seals have solved the problem of rapid seal wear, they require an oil impermeable seal not only between the two seal members but also at the place of seal engagement with the hub bore and around the periphery of the axle. These seals generally include a first annular surface which is press fit into the bore in a hub. The hub, along with the press fit seal, is then installed on the axle as a unit.

Elastomeric seals have been provided with radially extending annular ribs to stop rotational movement between an axle and the sealing member and to seal around the potentially rough surface of the axle. These ribs undergo relatively large radial deflections to produce the necessary frictional engagement with the axle to prevent rotation during use. This relatively high degree of rib deflection generates high levels of resistance to axial movement of the seal. This resistance must be overcome to install the seal onto and along the axle. Such a rib configuration is shown in Bradfute, et al, U.S. Pat. No. 3,356,376, which, while providing an advancement over the seals of the past has been somewhat cumbersome to install.

By compensating for slight imperfections in a bore or around an axle, and by facilitating installation, these types of seals have generally been considered an advancement over prior metal-to-metal contact seal designs. However, extreme care is necessary to ensure that the seal member is properly in position and is not excessively deformed during installation. Use of improper installation tools has frequently damaged and deformed these seals beyond design limits thereby reducing seal effectiveness.

Due to the necessary frictional engagement between the elastomeric seal and the axle's outer surface there must be a tight press fit between the seal and the axle necessitating high axial installation forces. These installation forces should be properly distributed around the periphery of the seal such that the seal may be evenly inserted on the axle to guard against excessive seal deformation. However, if uneven installation forces are applied to the seal, for instance by using improper tools, structural portions of the seal may be permanently deformed, causing the seal to malfunction.

Therefore, a need exists for an easily installed seal which reduces installation forces, minimizes the risk of damage during installation and which provides the necessary engagement with the axle or hub surface to prevent rotation therebetween.

SUMMARY OF THE INVENTION

The oil seal of the present invention includes an outer annular sealing member which has a first sealing surface for frictional non-rotational engagement in a bore in a wheel hub. An inner annular sealing member includes a second sealing surface for frictional non-rotational sealing engagement about an axle. A rotational sealing element is secured to one of the members for providing rotational sealing engagement with respect to the other of the members. An anti-rotational seal structure is provided on one of the first or second seal surfaces with a radially extending annular sealing portion for providing an oil impermeable seal between the respective sealing member and its respective axle or bore. The seal structure further includes a plurality of circumferentially-spaced radially-protruding locking ribs. The locking ribs prevent rotational movement between the inner annular sealing member or the outer annular sealing member and the corresponding axle or bore of the vehicle.

It is an object of the invention to provide an oil seal which can be placed over an axle and/or in the bore of a hub and provide sufficient anti-rotational sealing forces between the respective axle or hub and the seal to selectively prevent rotation therebetween.

Another object of the invention is to provide an oil seal which requires minimal axial installation force to facilitate seal installation and to reduce the risk of seal damage during installation.

BRIEF DESCRIPTION OF THE DRAWINGS

FIG. 6 is an axial end view partially broken away showing an alternate embodiment of the rib members;

FIG. 7 is a view of the inner surface of the seal taken along lines 7—7 of FIG. 6; and FIG. 8 is a perspective view showing the rib members provided on the outer periphery of the oil seal.

DESCRIPTION OF THE PREFERRED EMBODIMENTS

Figure 1:
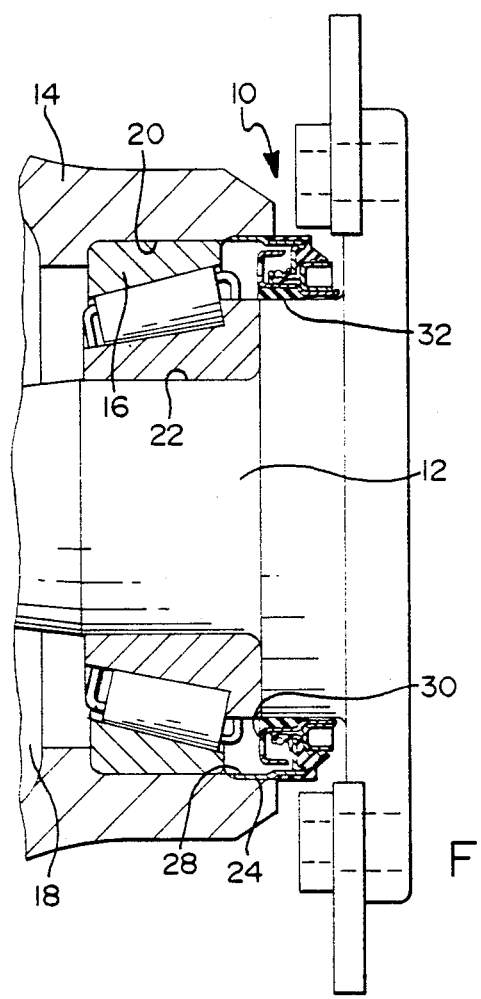
FIG. 1 is a fragmental cross-sectional view showing the oil seal of the present invention as used in the hub and axle of a vehicle.

Referring now to FIG. 1, the oil seal of the present invention is generally indicated at 10. The oil seal 10 provides rotational sealing engagement between axle 12 of a vehicle and a rotatable housing or hub 14.

In typical applications, hub 14 is rotationally mounted on the axle 12 with a pair of tapered roller bearings 16 situated therebetween. One bearing 16 is provided at the portion of axle 12 shown in FIG. 1 and a second roller bearing is provided at the outer terminal end of axle 12 (not shown) which end is sealed with a cap or the like to prevent the escape of oil. A space 18 is provided in the housing 14 and is filled with oil or other bearing lubricant.

The bearings 16 are press-fit into recesses 20 and 22 of the respective hub or axle for relatively friction free rotational movement between axle 12 and rotatable housing or hub 14. Generally, the axle is stationary while the rotatable housing or hub 14 is rotatable around the axle with a wheel being attached to the hub. However, the present invention could be used between any housing and shaft or in an arrangement where the housing 14 is stationary and the shaft 12 is rotational.

Figure 2:
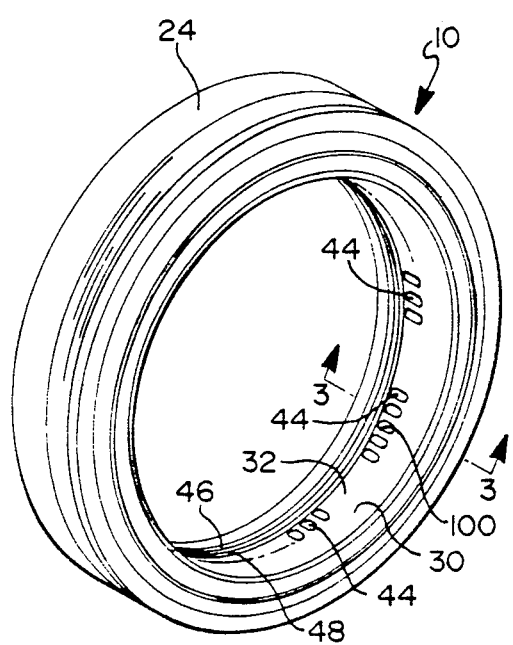
FIG. 2 is a perspective view of the oil seal member showing the rib members of the present invention.
Figure 3:
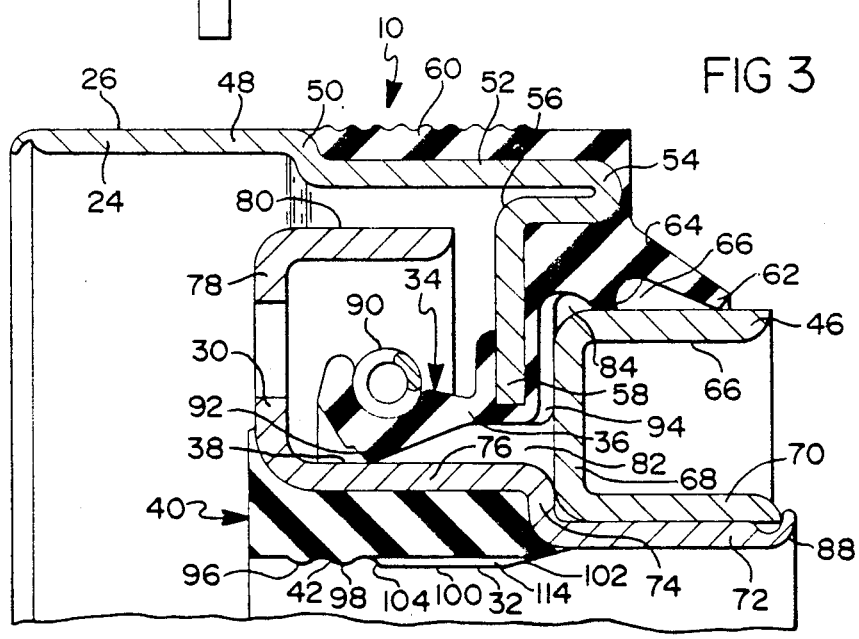
FIG. 3 is a fragmental cross-sectional enlarged view showing the sealing surface and rib members taken along line 3—3 of FIG. 2.

Referring now to FIGS. 1, 2 and 3, the oil seal 10 includes an outer annular sealing member 24 which has a first sealing surface 26 which is press fit within the bore 28 in hub 14 with a metal-to-metal contact. An inner-annular sealing member 30 includes a second sealing surface 32 for frictional non-rotational sealing engagement about the axle 12. A rotational sealing element 34 is provided which is secured to the outer sealing member for rotational sealing engagement with respect to the inner sealing member. Preferably the rotational sealing element 34 includes elastomeric seal 36 which is molded and secured to the outer annular sealing member 24. Sealing member 24 engages a wear sleeve surface 38 on the inner annular sealing member 30 so that the seal 36 rotates with the outer annular sealing member 26 and with hub 14 about the inner annular sealing member 30 and axle 12.

A significant aspect of the present invention is an anti-rotational structure generally indicated at 40. The anti-rotational structure 40 includes a radially extending annular sealing portion 42 for providing an oil impermeable seal between the sealing member 30 and the axle 12. The anti-rotational structure 40 further includes a plurality of circumferentially spaced radially protruding locking ribs 44 which prevent rotational movement between the inner-annular sealing member 30 and the axle 12.

This configuration allows a reduction of the axial forces required to install the seal because annular portion 42 is provided primarily for sealing around the axle. Unlike prior designs, annular portion 42 is not required to counteract rotational forces operating between the seal 10 and the axle 14. Therefore, a lesser radial deflection of annular portion 42 is required to position it on the axle since large compressive forces are not required to resist rotation. Rather, ribs 44 are specifically provided for counteracting the rotational forces. The annular sealing portions 42 provide for oil impermeable sealing about axle 12 while ribs 44 provide the necessary anti-rotational radially-directed compressive forces to prevent the seal and sealing member 30 from rotating around the axle 12.

As seen in FIG. 3, the oil seal 10 may be formed as three-piece assembly which includes an outer annular sealing member 24, an inner annular sealing member 30 and a unitizing member 46. The outer annular sealing member 24 includes a bore-engaging portion 48 which leads to a step portion 50. An axially extending body portion 52 is provided which leads into a recurved portion 54 which leads to a curved portion 56 and a radially inwardly extending lip portion 58.

An elastomeric sealing member 36 is molded onto the first member 24 prior to assembly within the unitized oil seal 10. Seal member 36 includes a pair of dirt-excluding lip portions 62 and 64 which engage the axially extending surface 66 of the unitizing member 46. The unitizing member 46 includes an axially extending outer portion 66 and a radially extending portion 68 which bends into an axially extending inner portion 70.

The inner annular sealing member 30 includes a first axially-extending reinforcing portion 72 which is curved into a step 74 leading to a second reinforcement portion 76. A radially extending ledge 78 leads to an axially extending flange 80 which extends in an opposite axial direction. The anti-rotational sealing structure 40 is molded to the inner annular sealing member 30 thereby securing it to the surface 70 which reinforces the elastomeric anti-rotational sealing member 40.

To assemble the oil seal 10, the outer annular member 24 having the sealing member 36 molded in place is inserted within inner annular sealing member 30 with the sealing member having sealing lip 36 disposed over wear surface 38. Lubricant such as grease is then inserted within spaces 82, 84, and 86. The unitizing member 46 is then inserted within the assembly such that lips 62 and 64 of the sealing member 36 contact portion 66 of the unitized member 46 and portion 68 contacts step 74 of member 30 and surface 70 engages the surface 72. The lip portion 88 of inner annular sealing member 30 is then bent over to secure the unitizing member 46 within the assembly.

An annular spring 90 biases sealing member 36 at lip portion 92 into engagement with wear sleeve surface 38. Pads 94 are provided on the sealing member 36 to ensure alignment with the unitizing member 46. The pads are designed to be slightly worn away upon use such that there is substantially no contact between the pads and unitizing member 46 during seal rotation.

The anti-rotational seal structure preferably includes a pair of radially extending annular rib portions 96,98 in a first axial portion thereof and a second axial portion including a series of axially aligned and radially inwardly extending rib members 100.

In a preferred embodiment eight groups of five rib members 100 are equiangularly spaced about the inner-circumference of the seal as shown in FIG. 2. As seen in FIG. 3, the rib members have axial cross-sections which generally define a trapezoid thereby providing ramped guide surfaces 102 and 104 which facilitate installation and help to position and guide the oil seal upon the axle.

Annular rib portions 96 and 98 and rib members 100 preferably extend radially inwardly to an uninstalled diameter which is less than the outside diameter of the axle 12 such that upon installation annular rib portions 96 and 98 and rib members 100 are deflected radially outwardly to provide a compressive intereference fit over the axle 12.

It is preferable that the annular rib portions 96 and 98 extend sufficiently radially inwardly to form an oil impermeable seal about the circumference of a particular axle diameter. The rib members 100 advantageously extend slightly further radially inwardly than the annular rib portions 96 and 98 to provide the necessary mechanical engagement with the shaft to secure member 30 against rotation about axle 12.

A nitrile elastomeric material of 70 Shore A hardness has been used for the anti-rotational seal structure 40. Other materials suitable for use in the present invention include silicone, fluoro elastomers and poly-acrylic materials. While 70 Shore A is a desired hardness for the present invention, softer or harder materials could be used by adjusting the depth of the rib members 100 and annular rib portions 96 and 98 to provide the necessary anti-rotational and sealing engagement respectively about the axle 12.

Frictional loads between the seal and the axle 12 are reduced during installation because rib portions 96 and 98 are elastically compressed to a small extent and because only the width of the rib members 100 engages the axle 12 upon installation. This reduced or minimal surface contact between the ribs results in less material deformation than that which occurs with a continuous annular rib. Less material deformation results in less frictional forces and correspondingly lower installation forces between the ribs and axle or the ribs and bore. Additionally, the ramp surfaces 104 help to center the seal around the axle 12.

Figure 4:
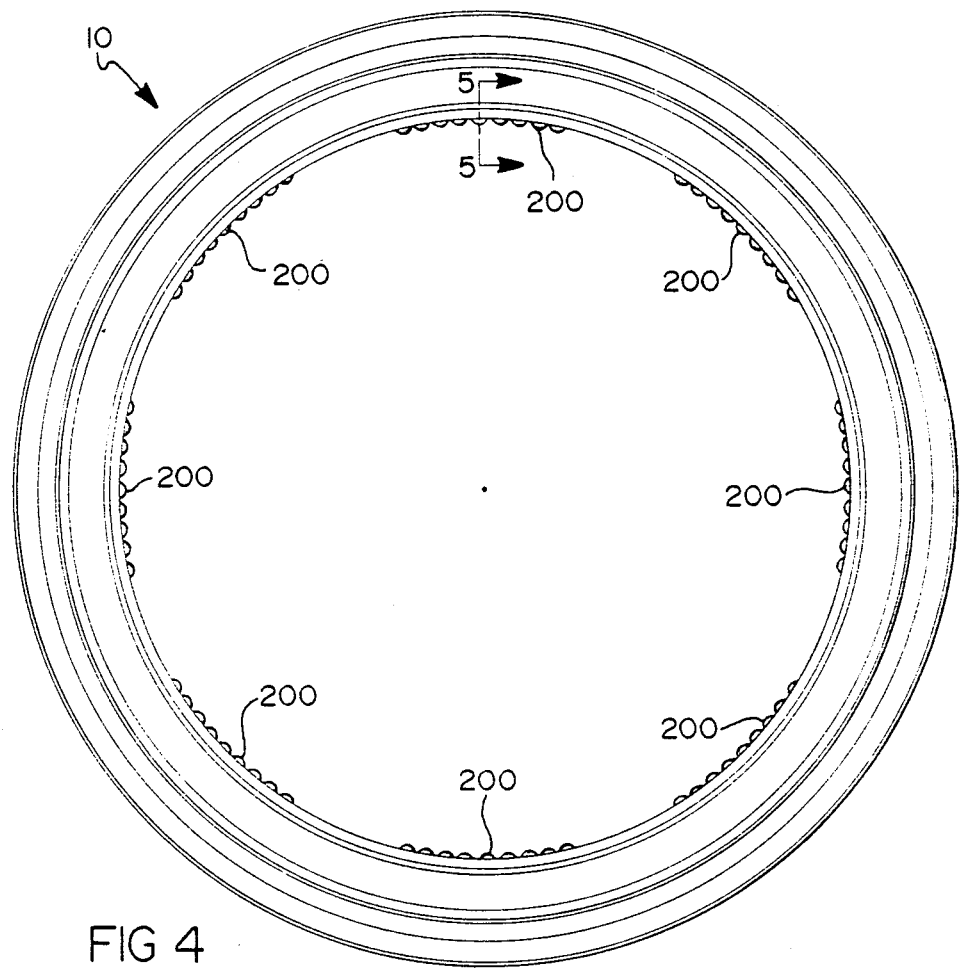
FIG. 4 is an axial end view showing the seal of the present invention with an alternate embodiment of the rib members.
Figure 5:
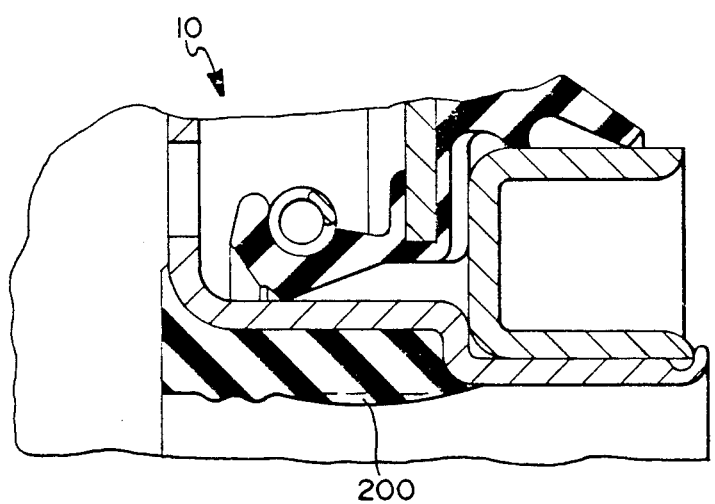
FIG. 5 is a cross-sectional view partially broken away taken along line 5—5 of FIG. 4 showing the side profile of the rib members.

An alternate embodiment is shown in FIGS. 4 and 5 wherein axially extending rib members 200 have an arcuate axial cross-section. It has been found that configurations of this embodiment are advantageously used in equiangularly spaced groups, each group including nine rib members. In a preferred embodiment eight groups of nine members are equiangularly spaced around the circumference of the seal 10.

In a further embodiment shown in FIGS. 6 and 7, groups of six rib members 300 and 302 are alternatively angled in opposite directions to the axis along the circumference of the seal member 60. The rib members include a first group of rib members 300 which is angled at a first angular direction and second group of rib members 302 which is angled in an opposite direction as shown in FIG. 7. These groups are alternately spaced around the circumference of the seal and may be inwardly extending to a greater extent than the other rib members of the prior embodiments. When the seal is positioned on the axle, the rib groups are aligned at a transverse angle with respect to the axis of the axle. The rib members 300 and 302 engage the axle to prevent axial rotation in either direction since the rib groups are alternately angled in their engagement with the axle in a direction opposing the rotation of the axle 12.

While the anti-rotation ribs shown in the present specification are illustrated for use in the engagement of the axle they may be provided on the outer portion of the outer sealing member where it engages the bore of the hub. As shown in FIG. 8, the anti-rotation ribs are located on the outer surface of the sealing member 10 to provide sealing between the hub member and the seal member and to provide for an easily installed anti-rotational arrangement.

While the invention has been described in an illustrative manner it is to be understood that the terminology which has been used is intended to be that of description rather than that of limitation. Obviously, many modifications and variations of the present invention are possible in light of the above teachings. It is therefore to be understood that within the scope of the appended claims, the invention may be practiced otherwise then as specifically described.

What is claimed is:

1. A lubricant seal, comprising:
    an outer annular sealing member having a first sealing surface adapted for frictional non-rotational sealing engagement in a bore;
    an inner annular sealing member having a second sealing surface adapted for frictional non-rotational sealing engagement about a shaft;
    sealing means secured to one of said members and providing rotational sealing engagement with the other one of said members; and
    anti-rotational seal means provided on one of said first and second sealing surfaces including a radially-extending annular sealing portion for providing an oil impermeble seal between the respective sealing member and its respective shaft or bore, said seal means further including a plurality of axially-extending circumferentially-spaced radially-protruding ribs for preventing rotational movement between one of said inner annular sealing member and said outer annular sealing member and the corresponding shaft or bore, said ribs protruding radially further than said annular sealing portion, said ribs being elongated in the axial direction such that their axial length is greater than their circumferential width, and such that said ribs provide substantial anti-rotational resistance without generating a corresponding axial resistance; and
    said annular sealing portion being radially compressed during installation to an extent less than the corresponding radial compression of said ribs.

2. The oil seal according to claim 1, wherein said antirotational seal means is provided on said second sealing surface for providing non-rotational engagement between said inner annular sealing member and said shaft.

3. The oil seal according to claim 2, wherein said ribs are separated into a series of circumferentially-spaced rib groups, the ribs in each group being closer together than the spacing between groups.

4. The oil seal according to claim 3, wherein said ribs have axial trapezoidal cross-sections.

5. The oil seal according to claim 3, wherein said ribs have arcuate axial cross-sections.

6. The oil seal according to claim 3 wherein the ribs in said groups of ribs are skewed with respect to the axial direction.

7. The oil seal according to claim 1, wherein said antirotational seal means is provided on said first sealing surface for providing non-rotational engagement between said outer annular sealing member and said bore.

8. A lubricant seal for sealing along a cylindrical surface comprising:
   an annular seal assembly comprising a rigid annular reinforcement member extending generally parallel to said cylindrical surface, and an annular elastomeric seal body molded to said reinforcement member;
   said elastomeric seal body having an exposed annular face in near proximity to said cylindrical surface, at least one endless resilient circumferential rib projecting from said exposed annular face for continuous sealing engagement with said cylindrical surface, and a plurality of resilient circumferentially-spaced anti-rotation ribs projecting radially from said exposed annular face for frictional engagement with said cylindrical surface to prevent relative rotation between the seal body and the cylindrical surface, said anti-rotation ribs providing greater resistance to said relative rotation than said circumferential rib;
   said anti-rotation ribs being axially spaced from said circumferential rib and having a length dimension extending primarily in an axial direction, a width dimension extending circumferentially, and a height dimension extending radially.

9. The lubricant seal of claim 8 wherein the height dimension of said anti-rotation ribs is greater than the height dimension of the circumferential sealing rib.

* * * * *